Figure 1:
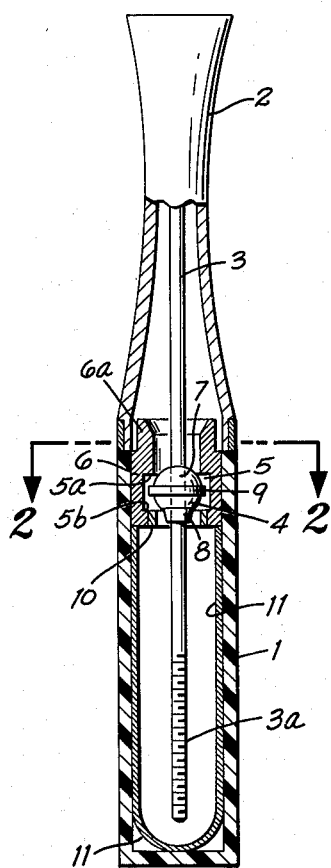

Sept. 8, 1964 N. PITTONI 3,147,511
POCKET CASES FOR COSMETIC CREAM, PROVIDED
WITH A DISTRIBUTOR MEMBER
Filed July 18, 1962

NELLA PITTONI
INVENTOR.

BY
ATTORNEY

3,147,511
POCKET CASES FOR COSMETIC CREAM, PROVIDED WITH A DISTRIBUTOR MEMBER
Nella Pittoni, Via S. Rocco 15A, Udine, Italy
Filed July 18, 1962, Ser. No. 210,786
4 Claims. (Cl. 15—521)

This invention relates to the pocket cases, intended for containing cosmetic creams, of the kind comprising a distributor member for drawing a metered quantity of cream, this member consisting of a thin stem or rod which is immersed into said cream.

More particularly, this invention is concerned with a case as specified above, comprising a container and a closing cap removable from said container, to which is fastened the drawing rod or stem which is immersed into said container when the cap is applied thereon and is withdrawn from the container when said cap is removed therefrom. The case is suitably provided, in its portion which must come into contact with the cream, with superimposed circular grooves or a portion of helical thread, which allow said rod to draw a given quantity of cream when it is removed from the case.

In the conventional cases of this kind, in order to meter the quantity of cream drawn by the rod as aforesaid, by removing any excess, provision is made for scraper means secured to the container, which essentially comprise a sealing collar for the case provided with a hole through which the rod is inserted. The inside diameter or bore of this hole is slightly larger than the diameter of said rod, and therefore the bore edges will remove the excess cream from the rod, leaving thereon a thin layer whose thickness is substantially equal to the dimension of the annular slot defined by the bore edges and said rod.

The use of such scraper means has the disadvantages due to the fact that the drawing rod is guided by the hole provided in the collar mentioned above, and therefore it is prevented from displacing sideways at the inside of the container. This circumstance makes it difficult, or even impossible, to remove the cream from the sides of the container or, more generally, the cream disposed in those areas of said container which the rod cannot reach, so that it becomes impossible to remove all the cream from the container.

One object of this invention is to provide a case of the kind specified above, in which provision is made for scraper means adapted to afford full mobility of said rod at the inside of the container and in particular adapted to permit the rod to perform movements along a circular path on horizontal planes lying at different heights at the inside of the case, so as to obtain complete removal of the cream from said case.

A further object of the invention is to provide a case as specified above, comprising a container adapted to contain a removable reservoir which can be easily replaced for refilling said case.

Figure 2:
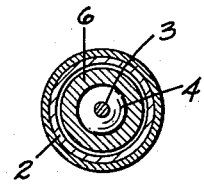

These and other objects and advantages will become apparent from the following detailed description and with reference to the accompanying drawings showing a preferred embodiment of the invention, wherein:

FIG. 1 is an axial section of the case, illustrating the latter with the cap applied in the closing position, and FIG. 2 is a section along line II—II of FIG. 1.

A casing in accordance with the invention essentially comprises a container 1, which may be made of any material desired but preferably of plastics, and a closing cap 2 for said container, which is removable from the latter and including a thin rod or stem 3 for taking out the cream, this rod being rigidly secured to said cap and of a length such as to remain fully immersed into said container when the cap 2 is applied thereon, as shown in the drawing; the rod is withdrawn from the container upon removal of said cap. Rod 3 is provided with a screw-threaded portion 3a which makes it easier to draw the cream from said container; this screw-threaded portion may be replaced with a portion corrugated in any suitable manner, obtained for instance by means of several circular grooves superimposed to one another. In order to draw a metered quantity of cream provision is made for scraper means adapted to remove from rod 2 the excess of cream when said rod is withdrawn from the container. In view of the purposes of the invention, these means are such as to permit a high mobility of said rod at the inside of the container and in particular they are such as to allow an inclination of the rod relative to the container axis in order to bring the rod end into contact with the inner wall of said container at any height.

According to an advantageous embodiment of the invention, said means comprised a ball-shaped member 4 contained into the recess 5 in a closing or sealing collar 6 for the container and movable with a spherical motion in said recess. The member 4 is provided with a diametral hole 7 through which rod 3 is inserted, and further comprises a hollow frusto-conical extension 8, substantially of funnel shape, aligned with the axis of said hole, directed with its apex towards the inside of the container and provided, at its portion of smallest diameter, with a protruding knife-like edge which is adapted to remove the excess of cream from said rod when the latter is withdrawn from the container through the hole in said ball-shaped member. In the embodiment illustrated, said ball-shaped member is further provided with a stop ring 9 fitted thereon along its maximum horizontal diameter, which may be integral with said member or applied thereto, whose outer diameter is greater than the maximum diameter of the ball-shaped member. In this instance, the recess 5 in the closing or sealing collar 6 is cylindrical and has an inside diameter larger than that of said stop ring, in order to allow free swinging movement of the latter, and with two end portions having a diameter which is smaller than that of said ring whereby to form two sealing shoulders 5a, 5b therefor. Suitably, one of said end portions is obtained by closing said recess by means of a further ring 10 removably mounted with respect to collar 6 to permit introduction of the ball-shaped member 4 into the recess 5. As a result of the arrangement of parts described above, said ball-shaped member 4 may be caused to swing freely in the corresponding recess, the oscillating movements thereof being limited by the sealing ring which further prevents said ball-shaped member from dropping out from the recess.

Further, according to the invention the sealing collar 6 may be disconnected from the container 1 and protrudes, from the edge of said container, by a suitable length 6a to receive the closing cap 2. The collar aforesaid advantageously constitutes the locking member for a removable reservoir 11, which is adapted to be withdrawn from said container and replaced for refilling of the case. The connection of the collar with the container may be accomplished in any manner known per se, but preferably it is made by forcing said collar into the recess in said container.

Having so described my invention, I state that what I wish to claim is as follows:

1. In a pocket case for cosmetic cream, comprising a container and a closing cap removable from said container, and including a drawing rod for the cream, which is immersed into said container when the cap is applied thereon and is withdrawn from the container when said cap is removed therefrom, a portion of the outer surface of the drawing rod being roughened to facilitate removal of cream from the container, a scraper means for metering the quantity of cream drawn by said rod, by removing any excess, comprising a ball-shaped member which is contained in the recess in a sealing collar for said container and movable with a spherical motion in said recess; said member being provided with a diametral hole in order to permit passage of said drawing rod at the inside of said container and being further provided with a hollow frusto-conical extension of funnel shape, aligned with the axis of said hole, directed with its apex towards the inside of the container and provided, at its portion of smallest diameter, with a protruding knife-like edge which is adapted to remove the excess of cream from said rod when the latter is withdrawn from the container through the hole in said ball-shaped member, and a removable reservoir in said container, the sealing collar being operative to lock the reservoir within the container.

2. A case as claimed in claim 1, wherein said ball-shaped member is provided with a stop ring fitted thereon along its maximum horizontal diameter, whose outer diameter is greater than the maximum diameter of said ball-shaped member, said recess being of cylindrical shape with an inside diameter larger than that of said stop ring and further with two end portions having a diameter which is smaller than that of the stop ring whereby to form two sealing shoulders therefor; one of said end portions being removable from said collar to permit introduction of the ball-shaped member into said recess.

3. A case as claimed in claim 1, wherein said sealing collar for the container protrudes from the edge of the latter by a suitable length to receive said closing cap.

4. In a pocket case for cosmetic cream, comprising a container and a closing cap removable from said container, and including a rod for withdrawing the cream, a sealing collar for said container, said ball-shaped member comprising scraper means for said rod disconnectable from the container, a ball-shaped member fitted to a recess in the sealing collar, and movable in an angular direction relative to the recess, said ball-shaped member having an expanded cylindrical stop ring integral therewith, along the maximum horizontal diameter of the ball-shaped member, the recess in said sealing member being of substantially cylindrical contour, the inner diameter of the recess being greater than the outer diameter of the stop ring, the sealing collar including an end portion at one end of the recess, the diameter of the end portion being smaller than the stop ring to limit the longitudinal movement of the stop ring in one direction, the recess including a tubular extension operative to permit introduction of the ball-shaped member into the recess, and a tubular ring fitted to said extension to limit the longitudinal movement of the stop ring in a longitudinal direction opposite the end portion, and a removable reservoir in said container, which may be locked in position at the inside of the latter by said sealing collar.

References Cited in the file of this patent
UNITED STATES PATENTS

| | | |
|---|---|---|
| 1,715,144 | Paulson | May 28, 1929 |
| 3,033,213 | Joss et al. | May 8, 1962 |
| 3,048,879 | Rosenthal | Aug. 14, 1962 |